(12) United States Patent
Chretien et al.

(10) Patent No.: US 7,900,964 B2
(45) Date of Patent: Mar. 8, 2011

(54) GUIDED LOW AREA FOR THE FRONT OF A MOTOR VEHICLE

(75) Inventors: Jean-Michel Chretien, Cheminon (FR); Arnaud Cocu, Gommegnies (FR); Jean-Louis Colmont, Cergy Saint Christophe (FR); Thierry Derchu, Bar le Duc (FR)

(73) Assignee: ArcelorMittal Tubular Products Vitry, Vitry le Francois (FR)

( * ) Notice: Subject to any disclaimer, the term of this patent is extended or adjusted under 35 U.S.C. 154(b) by 568 days.

(21) Appl. No.: 11/993,102

(22) PCT Filed: Jun. 6, 2006

(86) PCT No.: PCT/FR2006/001268
§ 371 (c)(1),
(2), (4) Date: Dec. 19, 2007

(87) PCT Pub. No.: WO2006/136671
PCT Pub. Date: Dec. 28, 2006

(65) Prior Publication Data
US 2010/0201159 A1 Aug. 12, 2010

(30) Foreign Application Priority Data
Jun. 20, 2005 (FR) .................................. 05 06222

(51) Int. Cl.
*B62D 21/00* (2006.01)
(52) U.S. Cl. .................... 280/784; 180/274; 296/187.09; 296/193.03
(58) Field of Classification Search .................. 180/274, 180/232, 312; 280/784, 124.109; 188/376, 188/377; 296/187.03, 187.09, 35.2, 193.03
See application file for complete search history.

(56) References Cited

U.S. PATENT DOCUMENTS

| | | | |
|---|---|---|---|
| 5,605,353 A * | 2/1997 | Moss et al. | 280/784 |
| 5,738,378 A | 4/1998 | Yazejian | |
| 6,109,654 A * | 8/2000 | Yamamoto et al. | 280/784 |
| 6,298,936 B1 | 10/2001 | Yoshida | |
| 6,367,869 B1 * | 4/2002 | Baccouche et al. | 296/187.09 |
| 6,679,523 B2 * | 1/2004 | Yamamoto et al. | 280/785 |
| 7,066,531 B2 * | 6/2006 | Tomita | 296/187.03 |
| 7,229,099 B2 * | 6/2007 | Reim et al. | 280/784 |
| 7,380,829 B2 * | 6/2008 | Kishima | 280/781 |
| 7,393,016 B2 * | 7/2008 | Mitsui et al. | 280/784 |
| 7,407,192 B2 * | 8/2008 | Yoshimura | 280/784 |
| 2005/0189788 A1 * | 9/2005 | Cornell et al. | 296/187.09 |

FOREIGN PATENT DOCUMENTS
FR 2 855 805 12/2004

* cited by examiner

*Primary Examiner* — Paul N Dickson
*Assistant Examiner* — Drew Brown
(74) *Attorney, Agent, or Firm* — Oblon, Spivak, McClelland, Maier & Neustadt, L.L.P.

(57) ABSTRACT

A section of a motor vehicle front low area includes a first extendable elongated part, whose rear end is placed in front of a vehicle structural element embodied in a form of a cradle, whereas the front end thereof is connected to a bar-type structural element of the vehicle by a first connection device. The rear end of the first elongated part is movably mounted in front of the cradle-shaped vehicle structural element. The first connection device includes a connection in a form of a slide bar enabling a substantially longitudinal movement to be carried out and a removable stop member for normally hindering movement up to the removal.

18 Claims, 8 Drawing Sheets

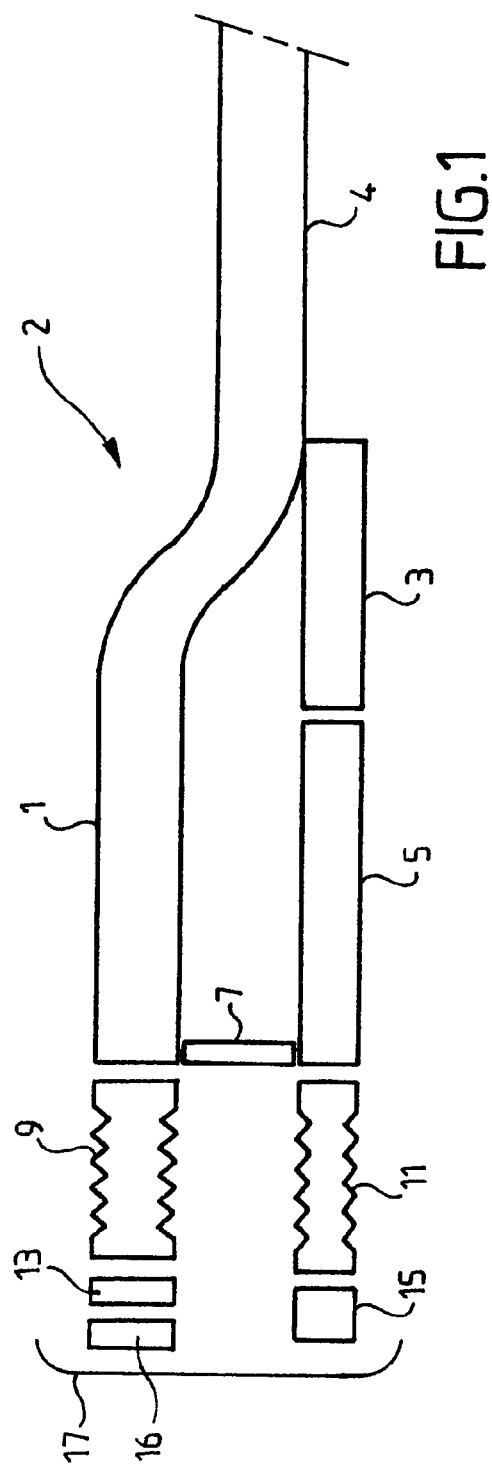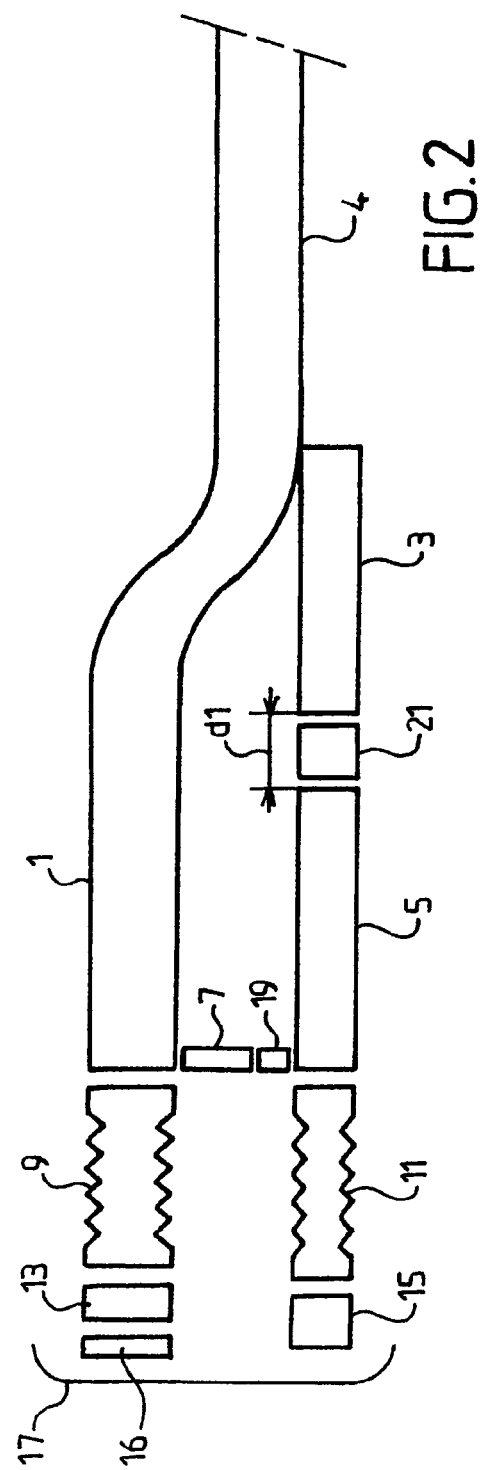

GUIDED LOW AREA FOR THE FRONT OF A MOTOR VEHICLE

Figure 1A:
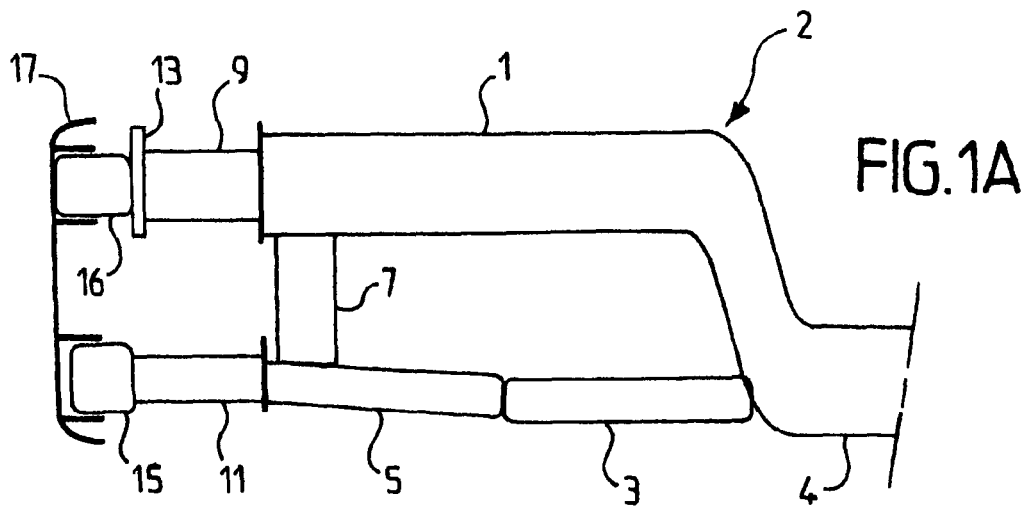

The invention relates to the front part of a motor vehicle. It relates more particularly to the lower area of this front part, known as the front low area.

The front of the motor vehicle comprises a cradle (more precisely "front cradle") which supports the front suspension. In one embodiment of the front part of the vehicle, a first elongated part, or extension, extends towards the front of the vehicle, in a generally horizontal (or substantially horizontal) direction, starting from the front cradle, in the lower zone known as the front low area. To this is generally added a second elongated part, or hanger, mounted substantially vertically (or close to the vertical) between the extension and a structural element of the vehicle. More precisely, this latter structural element may be the front part of the front chassis member, where this front part rises (forwards) to surmount the cradle and the extension. As a whole, the front chassis extends substantially over the front part of the vehicle. It will be understood that the extension and the cradle belong to the front low area of the vehicle.

A first connecting member is provided between the first part and the second part. This can generally be summarised as a fixed assembly of the extension and hanger, formed for example by bolting or welding.

The front part of the vehicle plays an essential part in the event of impact, and particularly frontal impact. It must be capable of participating in the shock absorption, i.e. helping to absorb and dissipate the energy produced by the impact, notably by deforming.

For example, the front part must be capable of absorbing a high intensity impact without causing deformation of the vehicle interior so as to guarantee the safety of the passengers. However, it must not have excessive rigidity. In fact, in the event of a low intensity impact which may correspond to a collision with a pedestrian, it should be capable of deforming without any substantial force, otherwise the pedestrian could suffer serious injuries.

These constraints and others are laid down by standards which govern the field of motor vehicle construction. It will readily be understood that it is important to be able to predict and if necessary adapt the behaviour of the front part of the vehicle during impact of different intensities. In a sector which is as competitive as the motor industry it is also essential to propose designs for the front part which are as inexpensive as possible, both for fitting in the first place and for repairs after an accident.

Generally, the term front section is used here to refer to the half of the front area which is located on one side of the vehicle; similarly, the term section of front low area refers to the half of the front low area located on one side of the vehicle. There are in principle two sections of front (low) area which are similar to one another.

As the known low areas have been only partly satisfactory in these respects, the invention proposes to remedy the situation.

To this end, the invention starts from a section of a front low area for a motor vehicle comprising a first elongated part, of the extension type, the front end of which faces a structural element of the vehicle of the cradle type, while its front end is connected to a structural element of the vehicle of the chassis member type by a first connecting device. The rear end of the first elongated part is movably mounted opposite the structural element of the vehicle of the cradle type. Said first connecting means comprises a connection of the slide bar type which allows movement in a substantially longitudinal general direction, and a removable stop member designed to prevent this movement under normal circumstances until it is removed.

In one embodiment, the first connecting member comprises a second elongated part, of the hanger type, of substantially vertical orientation, and the slide bar-type connection is provided between the first part and this second part.

There is thus a possibility of relative movement between the extension and the vehicle structure after the stop member has been removed.

As will be seen in more detail, slight forces which are insufficient to cause the stop member to be broken away do not generally cause any damage to the assembly comprising the hanger and the extension. Once the stop member is broken away, movement of the extension becomes possible. However, at least to begin with, the hanger does not deform because it is not integrally connected to the extension. Thus, the hanger is not damaged in the majority of impacts, thus reducing the number of parts that have to be replaced after the impact.

Figure 1B:
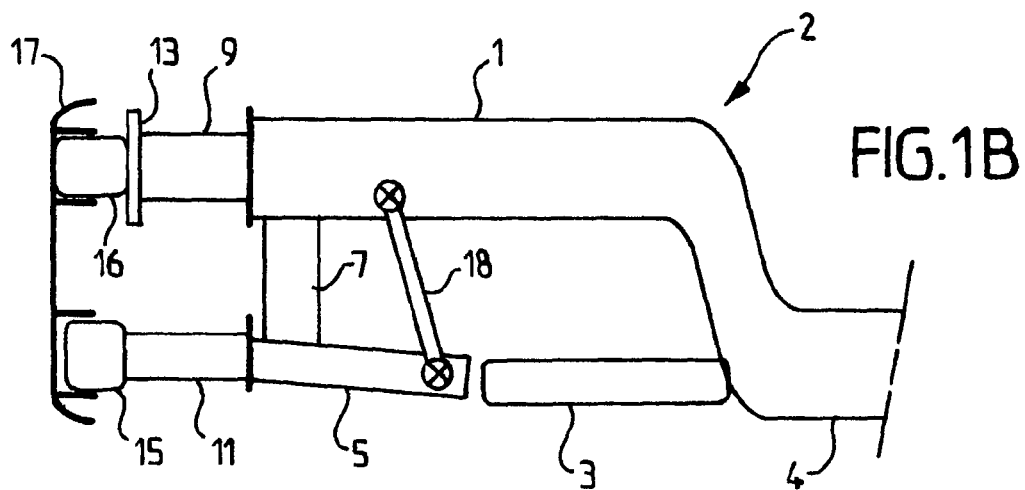
Figure 2A:
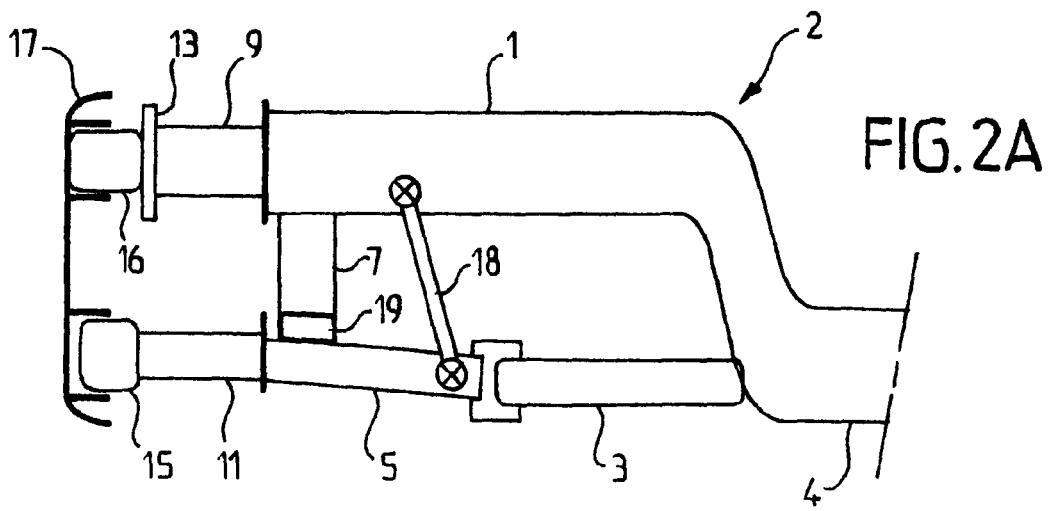
Figure 3:
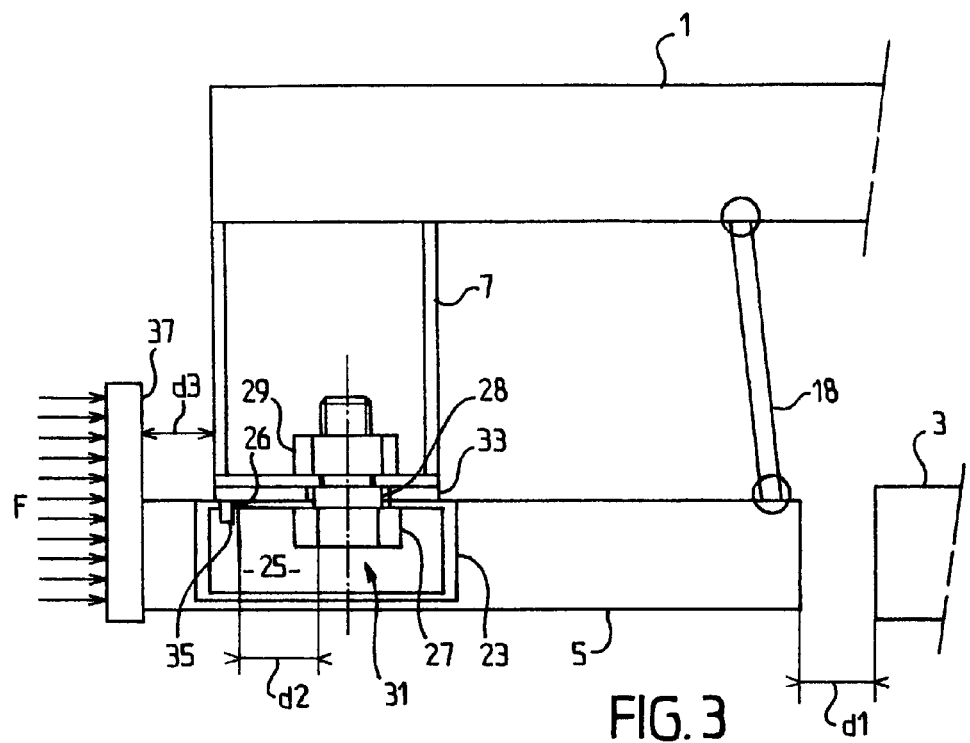
Figure 8:
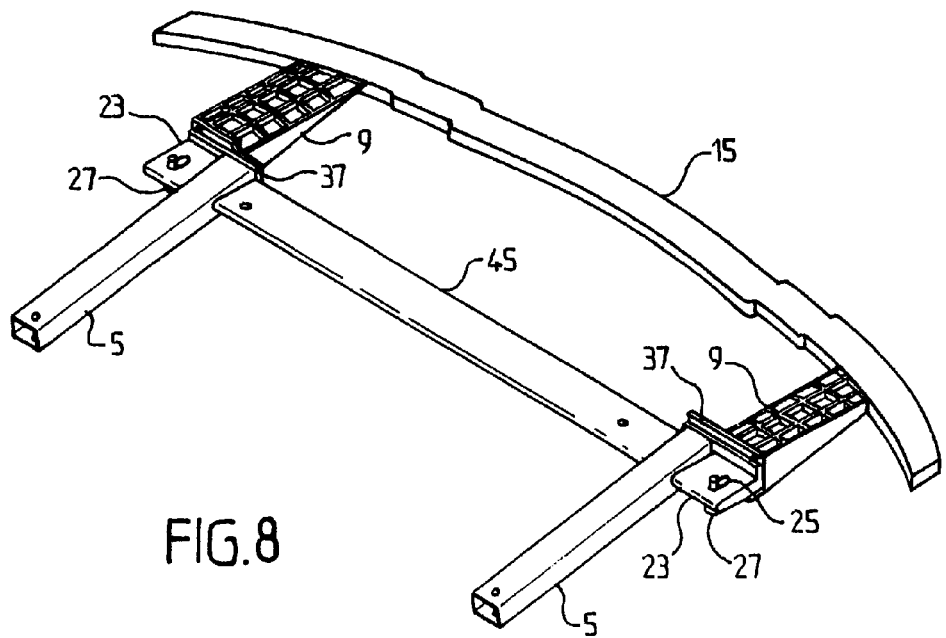
Figure 4:
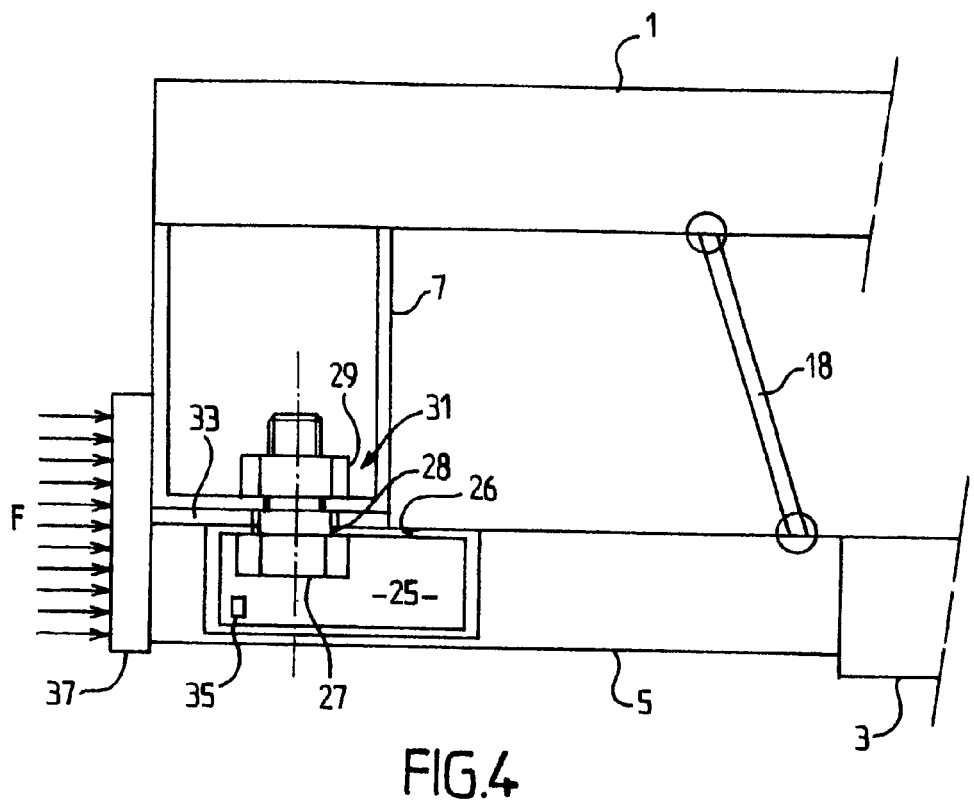
Figure 9:
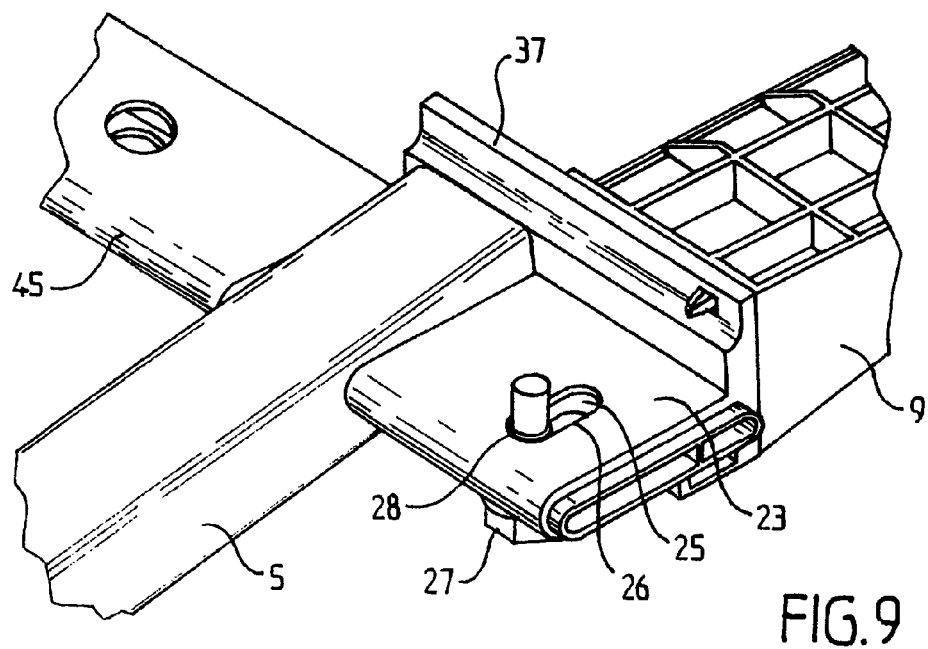
Figure 5:
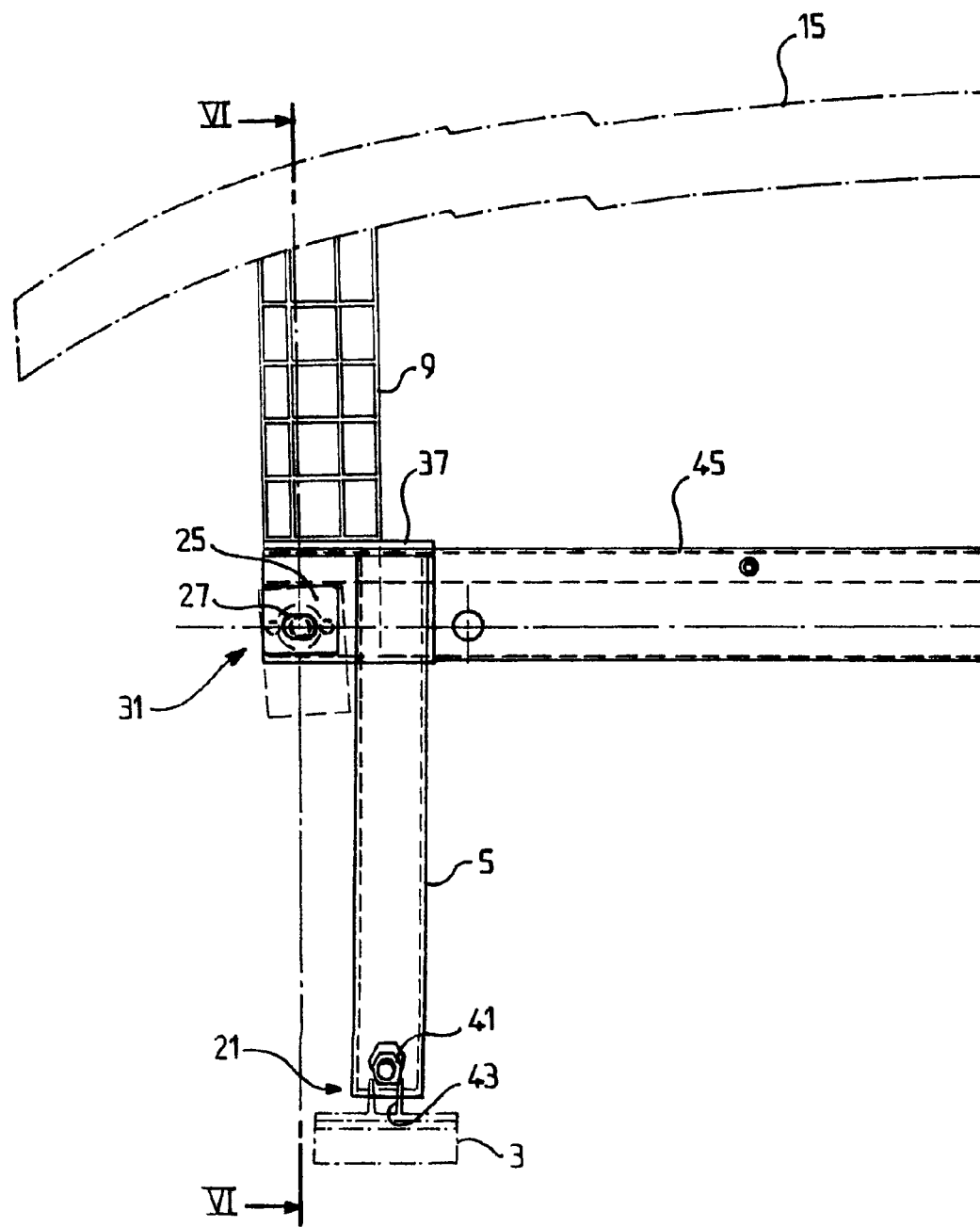
Figure 6:
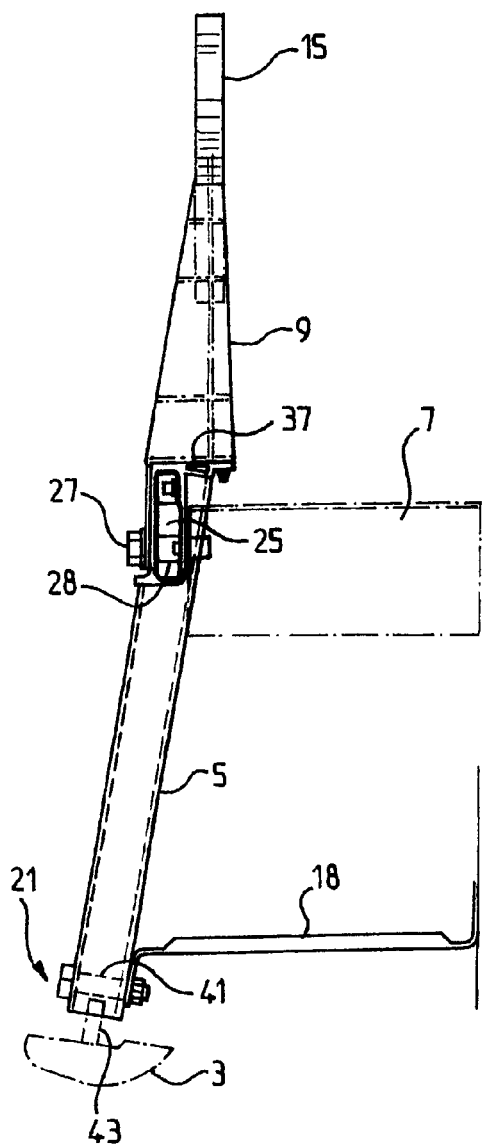
Figure 7:
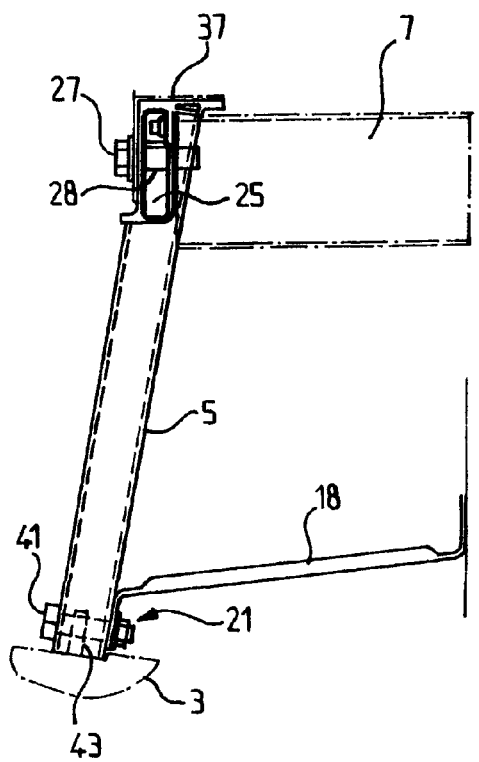
Figure 10:
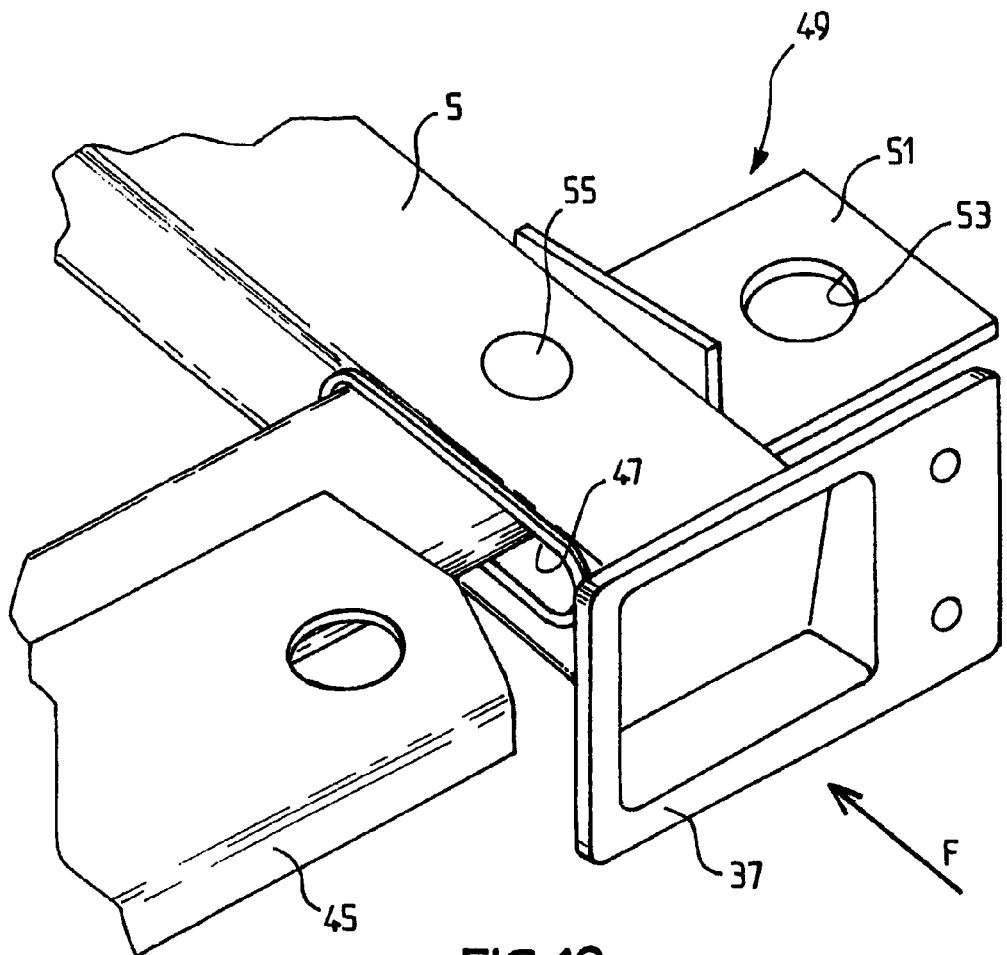

Further features and advantages of the invention will become apparent from a study of the detailed description that follows, and the accompanying drawings, wherein:

FIG. 1 diagrammatically shows the front of a motor vehicle viewed from the side comprising a low area according to the prior art, FIGS. 1A and 1B are more detailed diagrams of two known embodiments of the front of a motor vehicle, viewed from the side, FIG. 2 diagrammatically shows a side view of a front area of a vehicle fitted with a low area section according to the invention, FIG. 2A is another diagram of the front area of FIG. 2 which is more detailed, as in FIGS. 1A and 1B, FIGS. 3 and 4 diagrammatically show a partial side view of the front of a vehicle comprising a low area section according to the invention according to a first embodiment, intact and after impact, respectively, FIG. 5 is a detailed plan view from below of a section of front area, comprising the section of low area in FIG. 3, FIG. 6 is a sectional view along the line VI-VI of the low area section in FIG. 5, FIG. 7 is a partial sectional view through the low area section in FIG. 5 after impact, FIG. 8 is a perspective view of the low area section in FIG. 5, FIG. 9 is a detailed view of part of FIG. 8, FIG. 10 is a perspective view of part of a low area section according to the invention, in a second embodiment, and FIGS. 11 to 14 diagrammatically show a front area section of a vehicle fitted with a low area according to the invention, as a function of the speed associated with the impact encountered.

The accompanying drawings may not only serve to complete the invention but may help to define it, as necessary.

FIG. 1 shows a front part, of a known kind, for a motor vehicle. This figure shows a terminal section 1 which is the front part of an elongated structural element 2 of the vehicle, an element which may be referred to as the front chassis member (hereinafter referred to as the "chassis member" for short). The chassis member 2 passes over a structural element 3 of the vehicle which may be referred to as the front cradle (hereinafter known as the "cradle" for short). This cradle 3 generally comprises a platform provided with fixings (not shown) intended to support the front suspension of the vehicle and itself linked to the front axle.

The front part 1 of the chassis member 2 and cradle 3 generally extend in planes which are parallel to one another. The front part 1 of the chassis member 2 extends beyond the cradle 3 in its length. The chassis member 2 has here a rear part 4 which extends parallel to the front part 1 of the chassis member 2, at a height close to the height of the cradle 3, by higher values in this case. The cradle 3 may be rigidly fixed to the rear part 4 of the chassis member 2, for example by welding, riveting or bolting. In this case the cradle 3 may be referred to as "unfiltered". In other case the cradle 3 may be connected to the rear part 4 of the chassis member 2 via a flexible system that filters vibrations, such as a "flexible mounting". The cradle is then generally referred to as being "filtered".

In these known embodiments a first elongate part of the extension type 5 extends substantially parallel to the front part 1 of the chassis member 2, from the cradle 3 to substantially in alignment with the front part 1 of the chassis member 2. The extension 5 is formed for example as a girder element. A second elongated part of the hanger type 7 vertically connects the front part 1 of the chassis member 2 to the extension 5. The hanger 7 is embodied for example as a girder element. The front part 1 of the chassis member 2 receives, at a free end, a shock absorbing member or shock absorber 9. The extension 5 receives at a free end a shock absorber 11. The shock absorbers 9 and 11 are designed to deform, generally lengthways, thereby dissipating a specified quantity of energy, at least substantially.

The front part 1 of the chassis member 2 supports one side of a median bumper cross bar 13 via the absorber 9. The extension 5 partly supports a lower bumper cross bar 15 via the absorber 11. The cross bar 15 is sometimes referred to as the "pedestrian cross bar" or "pedestrian beam". The cross bars 13 and 15 may be made in the form of sections which are longitudinally curved. As shown in FIGS. 1A and 1B, the cross bar 13 may carry one or more additional elements 16 for absorbing "soft" impacts, i.e. theoretically deformable. These absorbers may take the form of a profile made of foam or a plurality of cuboid parts made of foam or semi-soft plastics. The cross bars 13 and 15 are covered with a transverse shell or shield 17. More precisely, the soft absorber 16 is accommodated in a cavity formed in the shield 17, thus helping to support the shield 17. The cross bar 15 is inserted in another cavity which is also provided in the shield 17. The cross bar 15 does not necessarily help to support the shield 17, i.e. it may be housed in the cavity with some play.

In the case of a known vehicle with an unfiltered cradle (FIG. 1A) the extension 5 may be rigidly fixed to the cradle 3, for example by welding, riveting or bolting. By contrast, in the case of a known filtered cradle, the extension 5 is not rigidly fixed to the cradle 3. In the known embodiment of a filtered cradle shown in FIG. 1B, the extension 5 is not connected to the cradle 3. It is supported in this case by a metal bar 18, of the tie rod type, fixed to the front part of the chassis member 2. Other positioning systems may be provided between the extension 5 and the cradle 3, which are adapted to avoid the transmission of vibrations between the extension 5 and the cradle 3.

The vehicle front described above also comprises, symmetrically, a second front part of a second chassis member (like 1 and 2), a second extension (like 5), second absorbers (like 9 and 11) and, connected to the above, the cross bars 13 and 15 covered by the shield 17.

According to the prior art, the hanger 7 and extension 5 are conventionally attached fixedly and rigidly to one another. The extension 5 and hanger 7 may be attached and fixed by bolting or welding. The absorber 9 is attached by clipping or gluing to the front part 1 of the chassis member 2, for example; similarly, the absorber 11 is attached to the extension 5 by clipping or gluing, for example.

In the event of impact to the front part, the forces produced are transmitted to all the assembled parts fixed to one another. Thus, the forces produced by an impact are transmitted notably to the hanger 7 and to the extension 5. In the case of an unfiltered cradle structure (FIG. 1A), the forces may also be transmitted to the cradle 3 via the extension 5 at the same time.

The assembly comprising the extensions 5, the cross bar 15, optionally the absorbers 11, and the cradle 3 is generally referred to as the (front) low area. The assembly comprising the chassis members 1, cross bar 13, absorbers 9 and deformable element 16 is generally referred to as the (front) median area, while it should be noted that there may be a "top (front) area" above it. Moreover, as already mentioned, the term "section" will be used hereinafter to designate one of the sides of an area taken separately.

A low area section according to the invention will now be considered, first of all with reference to the diagram in FIG. 2.

In FIG. 2, a first connecting device 19 is mounted between the extension 5 and the hanger 7. The device 19 is arranged so as to allow movement of the extension relative to the hanger 7. Here, this movement is essentially longitudinal, the word "longitudinal" referring here to the axis that runs through the vehicle in the longitudinal direction.

The invention is particularly suitable for a filtered cradle structure. However, it may also be applied to an unfiltered cradle structure, provided that the possibility of longitudinal movement is allowed, instead of the rigid connection between the extension 5 and the cradle 3. If desired, a tie rod 18 may then be put into position (see FIG. 2A).

In FIG. 2, the part of the extension 5 which is located at the back of the hanger may be made shorter than in the conventional extension 5 shown in FIG. 1. It should be noted that the extension 5 in FIG. 2 is not integrally fixed to the cradle 3: a distance d1 separates the cradle 3 from the proximal end of the extension 5. The extension 5 may thus be made to move relative to the hanger 7 (and/or to the front part 1 of the chassis member 2), until it meets the cradle 3.

This movement is chiefly a translatory movement in this case. The movement may also be a translatory movement combined with rotation about an axis which is substantially not parallel to the long dimension of the extension. In other words, in addition to the movement of translation mentioned above, the extension 5 may rotate relative to the hanger 7. Alternatively, more complex guiding comprising a pivot joint is not ruled out.

In FIG. 2, the low area section further comprises a second connecting device 21 mounted between the cradle 3 and the extension 5. The device 21 may comprise guide means which may be of the cam type, suitable for guiding the movement of the extension 5 relative to the cradle 3.

Preferably, the first device 19 comprises a connection of the slide bar type accompanied by a removable stop member. (The word slide is used here to denote any movable guidance, not necessarily linear, in the manner of a cam, either with or without permanent contact). The removable stop member is calibrated, taking account of its assembly, so as to yield or break under a predetermined force, allowing for a degree of tolerance. The movement of the extension 5 can only take place beyond an applied force (which is longitudinal in principle) equal to or greater than the breaking force of the stop member. For lower forces this displacement is prevented.

A first embodiment of the invention is diagrammatically illustrated in FIG. 3. Here, the low area section further comprises an intermediate part 23 which is integrally attached to the extension 5. A groove 25 formed in said part 23 extends in the longitudinal direction of the extension 5 and opens outwards through an oblong hole 26. The groove 25 accommodates the head of a screw or journal pin 27 having a shoulder 28, the body of which projects from the outside of the groove 25 through the hole 26. The screw 27 is capable of moving within the groove 25 without coming out. A nut 29 which is in this case attached to the hanger 7, accommodates the screw 27 so that the extension 5 is fixed to the hanger 7 via the part 23. The groove 25, the screw 27 and the nut 29 thus cooperate to form a sliding connection 31 between the part 23 and the hanger 7. The connection 31 allows movement in the longitudinal direction of the vehicle, in accordance with the cooperation between the shoulder 28 of the screw 27 and the oblong hole 26, forming a cam. In the embodiment shown in FIG. 3, the part 23 is arranged in vertical alignment with the hanger 7. The hanger 7 has an at least partially hollow section which houses the nut 29. The nut 29 may be attached by welding.

In this embodiment, a plate 33 has a knob 35 housed in a hole formed in the part 23. The plate 33 is pierced by the screw 27 at the shoulder 28. For example, the plate 33 is arranged at one end of the hanger 7, between the hanger 7 and the part 23. It should be observed here that the play shown between the shoulder 28 and the oblong hole 26 is exaggerated for the purposes of the drawing. In practice this play is minimal, limited to the assembly requirements. The same is true of the play between the plate 33 and shoulder 38.

When a longitudinal force F is applied to the extension 5, while the plate 33 is abutting on the shoulder 28 of the screw 27, this force F is transmitted to the knob 35. When the force F reaches or exceeds the shearing breaking strengths of the knob 35, the latter gives way, as shown in FIG. 4. Movement between the hanger and the extension 5 is then possible.

The travel which the screw 27 is permitted is greater than the distance d1, so that the movement may continue until the extension 5 comes to abut on the cradle 3. This travel corresponds in this embodiment to the distance d2 which separates the shoulder of the screw 27 from the end of the oblong hole 26, in the resting position. In other words, the distance d2 is greater than d1.

In the embodiment in FIG. 3, the extension 5 supports, at one end, a plate 37 arranged perpendicularly to which the above mentioned absorber 11 may be fixed. The distance d3 between the plate 37 and the extension 5 must also be greater than the distance d2 to allow the extension 5 to move up against the cradle 3. In other words, the distance d3 must be greater than the distance d1.

The force F is shown in FIGS. 3 and 4 as being applied to the plate 37, as is the case in frontal impact in the longitudinal direction. For oblique frontal impacts the behaviour is the same with the longitudinal component of the forces encountered.

The tie rod 18 has two connections, on the one hand to the front part 1 of the chassis member 2 and on the other hand to the extension 5. These two connections are arranged to be compatible with the desired movement of displacement of the extension 5 relative to the cradle 3 and consequently relative to the front part 1 of the chassis member 2. For this purpose, connections of a mechanical joint type and/or articulation by deformation may be used. Different connections may be provided, so long as they allow the movement of the extension 5.

The tie rod 18 is arranged slightly obliquely in this instance. The tie rod 18 serves to suspend the extension 5 without interfering with the movement mentioned above between the extension 5 and the hanger 7. Here, the kinematics indicate that the movement of the extension may comprise a slight upward pivoting, on the cradle side, until the extension makes contact with the abutment (compare FIG. 6 with FIG. 7 in which the extension is in the position of abutment).

FIGS. 5, 6 and 7 are more detailed views of a low area according to the invention in the first embodiment. The extensions 5 are in the form of profiles of a substantially closed section which support at one end a plate 37 to which an absorber 9 is fixed. The absorber 9 takes the form, for example, of a metal cellular structure lined with foam. The pedestrian cross bar 15 may be made in the form of a curved profile.

The pedestrian cross bar 15 may be a tubular beam, for example of the type described in French Patent Application N. 05 03090 filed by the applicant on 30 Mar. 2005.

The extension 5 may be of the so called "programmed deformation" type, i.e. wherein the law of deformation under the effect of a compressive force and couples of perpendicular axis to a plane passing through this axis has been determined. More particularly, this law may comprise an energy absorption phase followed by destruction of the extension as described in French Patent Application FR-A-2855805. The use of an extension 5 of this kind makes it possible on the one hand to predict the quantity of energy that may be dissipated by the extension. It also makes it possible to discover the geometry of the extension once the energy has been dissipated.

In the embodiment described, the device 21 is in the form of an annular linear connection comprising a spindle 41 arranged transversely with respect to the extension 5 and capable of engaging in a (longitudinal) elongated cellular part 43 integrally fixed to the cradle 3 during the movement of the extension 5. Other solutions which ensure the guiding function may be envisaged. In particular, it is possible to provide a "finger" in the form of a spindle exceeding the length of the extension 5 and engaging in a bore of suitable diameter provided in the cradle 3.

As shown in FIGS. 8 and 9, the intermediate part 23 may be housed with no possibility of longitudinal movement in a hole provided transversely in the extension 5. For example, the part 23 is an outer part of revolution, of flattened cross section, fitting into an oblong hole shaped according to said section.

A cross bar 45 which connects the extensions 5 may for example help to support a radiator of the vehicle. Here, the cross bar 45 is made in the form of a profile of flattened section which engages at each end in the parts 23. In the embodiment shown in FIGS. 8 and 9, the part 23 and the plate 37 are formed in one piece. The hole in which the part 23 is accommodated is then designed to open out towards the end of the extension 5 for the purpose of mounting the assembly formed by the part 23 and the plate 37.

A second embodiment of the invention is shown in FIG. 10. The extension 5 is pierced by a longitudinal groove 47. The groove 47 is in the form of an opening oblong hole provided on one side of the extension 5.

The cross bar 45 engages in the groove 47. The shape of the groove 47 is adapted to allow longitudinal movement of the cross bar 45 relative to the extension 5. An intermediate part 49 is adapted to fit on to the end section of the cross bar 45 projecting beyond the extension 5. The part 49 supports a fixing plate 51 for the hanger 7. The plate 51 is arranged, for example, in vertical alignment with the hanger 7. The plate 51 is drilled for example with a hole 53 to accommodate a shouldered screw (not shown) which can be screwed into the nut 29.

The removable stop member is in this case a pin 55 which normally keeps the extension 5 and cross bar 45 attached to one another. For example, the pin 55 passes vertically through the extension 5 and enters the cross bar 45 through a hole (not shown). The pin 55 may for example take the form of a cylindrical rod of circular cross section. Under the effect of a longitudinal force F greater than the shear strength of the pin 55, the latter breaks and then allows relative movement of the cross bar 45 in the groove 47. Consequently, the movement of the extension 5 relative to the hanger 7 is also permitted.

The behaviour of a low area according to the invention during different kinds of impact will now be described with reference to FIGS. 11 to 14. In these figures the parts deformed during a particular impact are shown by cross hatching. The undeformed part are not shaded. The parts that move are represented by parallel hatching.

The following description of these figures relates to the particular example of a vehicle with a mass of about 1300 kg, at least insofar as the force values given are concerned.

Figure 11:
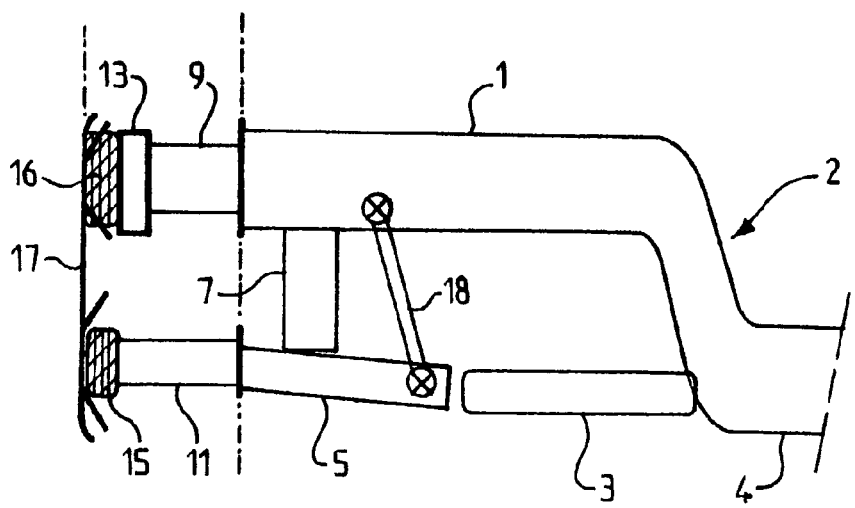

FIG. 11 first of all illustrates the case of frontal impact at very low speed, referred to as "pedestrian impact". The maximum speed is about V1=4 km/h. At speed V1 there is a longitudinal force F substantially achieving a first threshold value F1. In the example, F1=700 daN at 4 km/h. The calibration of the removable stop member (knob 35 or pin 55) corresponds to F1. More precisely, the pin 55 (or the knob 35) is of such a size as to present a shear strength of about F1.

As long as F<=F1, the cross bar 15 deforms plastically. The element 16 carried by the cross bar 13 also deforms plastically. Taking account of the small amount of energy brought into play in such an impact, the plastic deformations of the cross bar 15 and element 16 are sufficient to dissipate this energy, i.e. to absorb the impact. The cross bar 15 and the element 16 also have to be changed when the vehicle is repaired.

As shown in FIG. 11, the crushing of the element 16 and cross bar 15 cause expansion of these elements in the direction of height and width. This expansion causes destruction of the cavities in the shield 17 that houses these elements. The shield 17 thus also has to be changed. For very low values of the force F, the cross bar 15 and element 16 may be deformed elastically without having to be changed.

Figure 12:
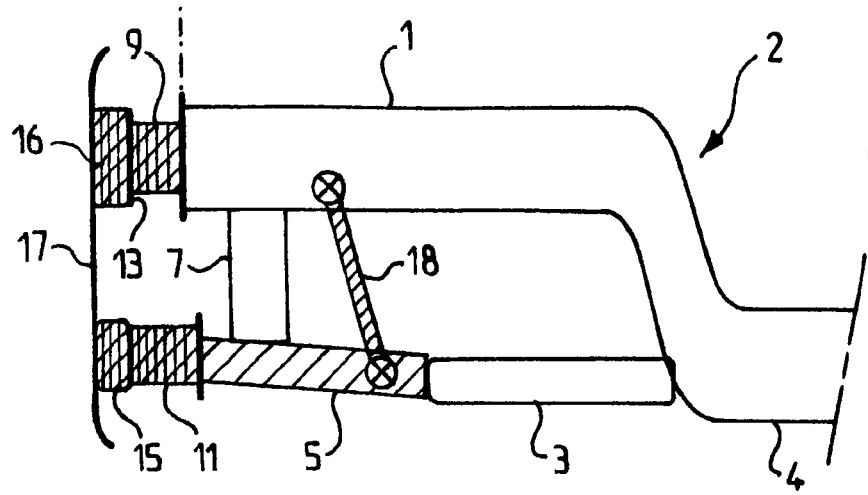

FIG. 12 shows an impact at low speed, i.e. substantially between V1 and V2, where V2 is equal to about 16 km/h. In this case, the force F achieves values greater than F1 and below a second threshold value F2. In this example, F2=3000 daN at 16 km/h.

As before, the lower cross bar 15 and the element 16 are deformed plastically, dissipating a specified amount of energy. The knob 35 (or pin 55) is shorn off at a value of F close to F1. Having been freed, the extension 5 then moves relative to the hanger 7 (which is immobile here) and moves into abutment on the cradle 3, this movement being guided by the tie rod 18. As the force F increases, compression of the absorbers 9 and 11 and of the cross bar 13 now takes place. It should be noted that as soon as the extension 5 comes to abut on the cradle 3 the front low area becomes longitudinally more rigid.

The extension 5 has been moved until it is in contact with the cradle 3 but has not been deformed. The hanger 7 is intact. The cross bar 15, the cross bar 13, the element 16, the knob 35 (or the pin 55) and the absorbers 9 and 11 are damaged and have to be replaced. The extension 5 is put back into position.

Figure 13:
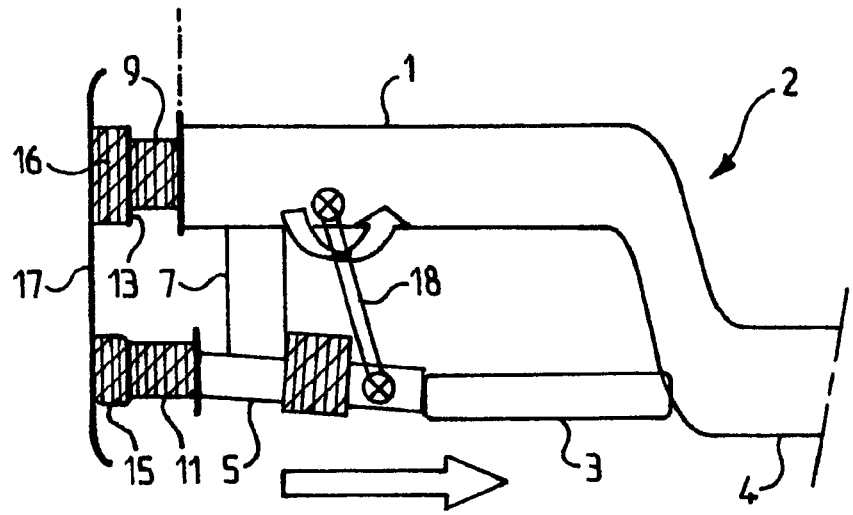
Figure 14:
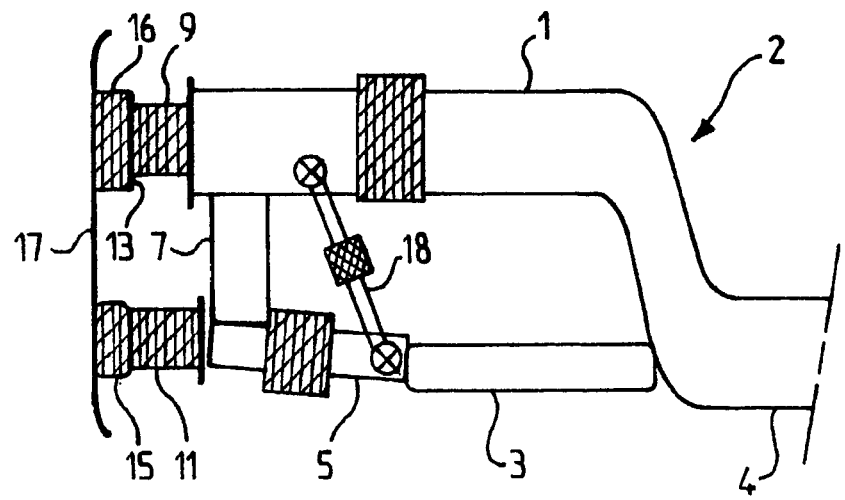

FIGS. 13 and 14 illustrate a high speed impact, i.e. substantially between V2 and V3, equal to about 64 km/h. In this case the force F reaches values in excess of F2 and below a threshold value F3. In the example, F3=7000 daN at 64 km/h.

The shock absorbing begins as indicated in the previous example. The absorbers 9 and 11 are totally compressed. Under the effect of the force F, the extension 5 abutting on the cradle 3 may undergo plastic deformation which dissipates more of the impact energy (FIG. 13).

The quantity of energy dissipated by the extension 5 is known when the extension 5 is of the "programmed deformation" type. In this case the length of the extension 5 deformed is also known. Other types of extension 5 may crumple.

If not all the energy of the impact has been dissipated, there is additionally a plastic deformation of the front part 1 of the chassis member 2 (FIG. 14), and possibly of an upper chassis member (upper area, not shown) if there is one on the vehicle. Plastic deformation of the hanger 7 may also take place. Furthermore, the cradle 3 may be deformed. Deformation of the cradle 3 occurs at the latest possible moment in order to protect passengers.

The above description relates to the case of frontal impact in the longitudinal and horizontal direction. Real impacts might be at an angle to the longitudinal direction of the vehicle and/or relative to the horizontal. The transverse components that result may modify the order in which the deformation of the parts takes place as described above.

Other embodiments may be envisaged. In particular, any means for producing a sliding connection between the extension 5 and the hanger 7 may be considered. The groove 25 could be formed directly in the extension 5. Similarly, any means for blocking this connection before reaching a threshold force may be applied. The resistance limits of the stop member has been defined mechanically hereinbefore; it could be at least partly controlled, using suitably positioned appropriate sensors, in which case the removable stop member might comprise a bolt that can be released on command, and/or a member that can be released by an electromagnet.

To summarise, the detailed description above relates to a low area section intended to be mounted on the front of a motor vehicle, having a cradle over which are provided chassis members. The section comprises at least one first mechanical element of elongated shape, at least one second mechanical element of elongated shape adapted to be fixed substantially perpendicularly to one of the chassis members, and at least one first connecting device, arranged between the first element and the second element and suitable for holding the first element in an extension of the cradle, at a specified distance therefrom, when the second element is fixed. The first connecting device comprises slide-type connecting means which allow movement between the first and second elements in a substantially longitudinal direction of the first element, and a stop member that cooperates with said connecting means to prevent said movement. This stop member cooperates with the connecting means to free up said movement when a longitudinal force in excess of a first threshold value is applied to the first element, so that the first element can move until it makes contact with the cradle under the effect of such a force.

The connection 21 and the tie rod 18 may be provided jointly or independently of one another on the low area according to the invention. Other means for supporting the extension 5 and guiding it may be provided. The cross bar 45 is also optional.

Two embodiments have been described in which, at the front, the extension moves with the cross bar relative to the hanger (FIG. 8 in particular), or the extension moves relative to the hanger on the cross bar (FIG. 10). It is also possible for the assembly consisting of the extension, the cross bar and the hanger (or part of it) to move relative to the front part 1 of the chassis member 2, the removable stop member being placed so as to act at the level of this movement.

At other levels it is generally possible to invert the positions of the camming elements and, if desired, the removable stop member.

The invention relates particularly to a vehicle fitted with a so called "short" cradle, i.e. a vehicle in which an extension may be put into position. Vehicles with a so called "long" cradle have not sufficient space at the front end to accommodate an extension 5. However, it should be noted that the expression "long" cradle is sometimes used to denote the assembly of cradle plus extension, in which case the invention is still of interest.

The description uses terms of the art which may vary from one country to another and from one motor manufacturer to another, for example. Thus:
- the hanger may also be referred to as the drop,
- the word "shaft" is sometimes used to refer to the front part of the chassis member, or a more extended part of this same chassis member,
- the cross bars are sometimes referred to as girders,
- the extension may also be referred to as an extension or add-on.

The invention covers a complete low area already mounted on a motor vehicle. It also covers a kit comprising all or some of the parts described above, in the form of separate parts, but also in the form of an assembly ready to be fitted to the vehicle.

The invention is not restricted to the embodiments described above by way of example but encompasses the variants that might be envisaged by the skilled man.

The invention claimed is:

1. A section of a front low area for a motor vehicle comprising:
   a first elongated part, a rear end of which faces a first structural element of the vehicle;
   a second structural element of the vehicle; and
   a first connecting device,
   wherein a front end of the first elongated part is connected to the second structural element of the vehicle by the first connecting device,
   wherein, with the rear end of the first elongated part mounted to be movable opposite the first structural element of the vehicle, the first connecting device includes a first connection, which allows movement in a substantially longitudinal direction, and a removable stop member configured to prevent the longitudinal movement, until it is broken off.

2. A section of a front low area according to claim 1, wherein the first connecting device includes a second elongated part, of a substantially vertical orientation, and wherein the first connection is provided between the first elongated part and the second elongated part.

3. A section of a front low area according to claim 2, wherein the first connection includes a longitudinal groove integral with the first elongated part and a journal pin integral with the second elongated part.

4. A section of a front low area according to claim 3, wherein the stop member includes a knob housed in the first elongated part and integral with the second elongated part.

5. A section of a front low area according to claim 4, wherein the knob is substantially calibrated for shear resistance.

6. A section of a front low area according to claim 2, wherein the first connection includes a longitudinal groove on the first elongated part, an intermediate part housed in the groove, and means for fixing the second elongated part to the intermediate part.

7. A section of a front low area according to claim 1, further comprising a second connecting device between the rear of the first elongated part and the first structural element of the vehicle, the second connecting device including guide means for the first elongated part.

8. A section of a front low area according to claim 7, wherein the guide means includes a linear-annular connection.

9. A section of a front low area according to claim 8, wherein the linear-annular connection includes a longitudinal elongated cell configured to accommodate a knob.

10. A section of a front low area according to claim 1, wherein the first elongated part supports a shock absorbing member.

11. A section of a front low area according to claim 1, wherein the first elongated part at least partly supports a transverse beam.

12. A section of a front low area according to claim 11, wherein the shock absorbing member is disposed between the transverse beam and the first elongated part.

13. A section of a front low area according to claim 1, wherein the first elongated part includes a section configured to deform longitudinally in a predictable manner.

14. A section of a front low area according to claim 13, wherein the section is configured to crumple.

15. A front low area for a motor vehicle comprising two sections according to claim 1,
   wherein a first section of a front low area is connected by a cross bar to a second section of a front low area.

16. A section of a front low area according to claim 15, wherein the stop member is a pin accommodated in the first elongated part and the cross bar.

17. A section of a front low area according to claim 16, wherein the pin is substantially calibrated for shear resistance.

18. A kit for a front low area for a motor vehicle, comprising two area sections each comprising:
   a first elongated part, a rear end of which faces a first structural element of the vehicle;
   a second structural element of the vehicle; and
   a first connecting device,
   wherein a front end of the first elongated part is connected to the second structural element of the vehicle by the first connecting device,
   wherein, with the rear end of the first elongated part mounted to be movable opposite the first structural element of the vehicle, the first connecting device includes a first connection, which allows movement in a substantially longitudinal direction, and a removable stop member configured to prevent the longitudinal movement, until it is broken off.

* * * * *